(12) United States Patent
McEldowney

(10) Patent No.: US 8,670,029 B2
(45) Date of Patent: Mar. 11, 2014

(54) DEPTH CAMERA ILLUMINATOR WITH SUPERLUMINESCENT LIGHT-EMITTING DIODE

(75) Inventor: Scott McEldowney, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 583 days.

(21) Appl. No.: 12/816,993

(22) Filed: Jun. 16, 2010

(65) Prior Publication Data

US 2011/0310220 A1    Dec. 22, 2011

(51) Int. Cl.
*G06F 3/042* (2006.01)
*G06F 3/048* (2013.01)
*H04N 7/18* (2006.01)

(52) U.S. Cl.
USPC ............... 348/77; 348/42; 348/121; 348/370

(58) Field of Classification Search
None
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,730,331 A | 3/1988 | Burnham et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,895,790 A | 1/1990 | Swanson et al. | |
| 4,901,362 A | 2/1990 | Terzian | |

(Continued)

FOREIGN PATENT DOCUMENTS

| CN | 1818734 A | 8/2006 |
|---|---|---|
| CN | 101191999 A | 6/2008 |

(Continued)

OTHER PUBLICATIONS

Zhang et al. "High-Performance Quantum-Dot Superluminescent Diodes" (Jan. 2004) IEE Photonics Tech. Letters, vol. 16, No. 1.*

(Continued)

*Primary Examiner* — Sath V Perungavoor
*Assistant Examiner* — Matthew J Anderson
(74) *Attorney, Agent, or Firm* — Judy Yee; Sergey Lamansky; Micky Minhas

(57) ABSTRACT

A depth camera illuminator with a superluminescent light-emitting diode (SLED) in a motion tracking system. One or more SLEDs have a sufficient power, such as 75-200 milliwatts, to extend in a field of view in an area such as a room in a home. To correct for chromatic aberration which would otherwise exist due to the wider range of wavelengths which are emitted by an SLED compared to a laser, an achromatic diffractive optical element is used to disperse the light over the field of view. The achromatic diffractive optical element can have a stepped multi-level profile with three or more levels, or a continuous profile. Based on a tracked movement of a human target, an input is provided to an application in a motion tracking system, and the application performs a corresponding action such as updating a position of an on-screen avatar.

20 Claims, 8 Drawing Sheets

(56) References Cited

U.S. PATENT DOCUMENTS

| | | |
|---|---|---|
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,416,562 A * | 5/1995 | Ota et al. .................. 355/53 |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,606,434 A * | 2/1997 | Feldman et al. ............ 359/3 |
| 5,616,078 A | 4/1997 | Oh |
| 5,617,312 A | 4/1997 | Iura et al. |
| 5,629,799 A | 5/1997 | Maruyama et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,930,383 A | 7/1999 | Netzer |
| 5,933,125 A | 8/1999 | Fernie |
| 5,980,256 A | 11/1999 | Carmein |
| 5,981,978 A | 11/1999 | Mushiage et al. |
| 5,989,157 A | 11/1999 | Walton |
| 5,995,285 A * | 11/1999 | Unno ........................ 359/565 |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,205,231 B1 | 3/2001 | Isadore-Barreca et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,262,844 B1 | 7/2001 | Soskind |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,493,095 B1 * | 12/2002 | Song et al. .................. 356/603 |
| 6,496,598 B1 | 12/2002 | Harman |
| 6,503,195 B1 | 1/2003 | Keller et al. |
| 6,539,931 B1 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,359 B2 | 5/2004 | Wei et al. |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,068,842 B2 | 6/2006 | Liang et al. |
| 7,113,918 B1 | 9/2006 | Ahmad et al. |
| 7,121,946 B2 | 10/2006 | Paul et al. |
| 7,163,302 B2 | 1/2007 | Pohlert et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,830 B2 * | 5/2007 | Nefian et al. .................. 382/154 |
| 7,227,526 B2 | 6/2007 | Hildreth et al. |
| 7,227,893 B1 | 6/2007 | Srinivasa et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,349,104 B2 * | 3/2008 | Geng ........................... 356/603 |
| 7,352,011 B2 * | 4/2008 | Smits et al. .................. 257/99 |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,404,644 B2 | 7/2008 | Evans et al. |
| 7,412,077 B2 | 8/2008 | Li et al. |
| 7,416,300 B2 * | 8/2008 | Wei et al. .................. 351/159.75 |
| 7,421,093 B2 | 9/2008 | Hildreth et al. |
| 7,430,036 B2 * | 9/2008 | Sekine ........................ 355/67 |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,471,376 B2 | 12/2008 | Bamji et al. |
| 7,489,812 B2 | 2/2009 | Fox et al. |
| 7,526,101 B2 | 4/2009 | Avidan |
| 7,536,032 B2 | 5/2009 | Bell |
| 7,555,142 B2 | 6/2009 | Hildreth et al. |
| 7,560,701 B2 | 7/2009 | Oggier et al. |

(56) References Cited

U.S. PATENT DOCUMENTS

| | | | |
|---|---|---|---|
| 7,570,805 B2 | 8/2009 | Gu | |
| 7,574,020 B2 | 8/2009 | Shamaie | |
| 7,576,727 B2 | 8/2009 | Bell | |
| 7,584,893 B2* | 9/2009 | Tsikos et al. | 235/462.42 |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,600,893 B2 | 10/2009 | Laino et al. | |
| 7,607,509 B2 | 10/2009 | Schmiz et al. | |
| 7,620,202 B2 | 11/2009 | Fujimura et al. | |
| 7,630,537 B2* | 12/2009 | Sato et al. | 382/154 |
| 7,668,340 B2 | 2/2010 | Cohen et al. | |
| 7,671,997 B2 | 3/2010 | Jayaraman et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,738,678 B2* | 6/2010 | Breed et al. | 382/100 |
| 7,746,345 B2 | 6/2010 | Hunter | |
| 7,760,182 B2 | 7/2010 | Ahmad et al. | |
| 7,764,414 B2* | 7/2010 | Kusunose et al. | 359/207.7 |
| 7,787,132 B2* | 8/2010 | Korner et al. | 356/601 |
| 7,809,167 B2 | 10/2010 | Bell | |
| 7,834,846 B1 | 11/2010 | Bell | |
| 7,844,079 B2* | 11/2010 | Hassebrook et al. | 382/108 |
| 7,852,262 B2 | 12/2010 | Namineni et al. | |
| RE42,256 E | 3/2011 | Edwards | |
| 7,898,522 B2 | 3/2011 | Hildreth et al. | |
| 7,974,443 B2 | 7/2011 | Kipman | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,082,120 B2* | 12/2011 | St-Pierre et al. | 702/85 |
| 8,134,719 B2* | 3/2012 | Liang et al. | 356/625 |
| 8,154,781 B2 | 4/2012 | Kroll et al. | |
| 8,157,174 B2* | 4/2012 | Kotlarsky et al. | 235/462.07 |
| 8,199,186 B2* | 6/2012 | Florencio et al. | 348/51 |
| 8,218,825 B2* | 7/2012 | Gordon et al. | 382/108 |
| 8,253,792 B2* | 8/2012 | Wells et al. | 348/86 |
| 8,350,847 B2* | 1/2013 | Shpunt | 345/419 |
| 8,390,821 B2* | 3/2013 | Shpunt et al. | 356/512 |
| 2001/0036018 A1* | 11/2001 | Arai | 359/642 |
| 2004/0026514 A1 | 2/2004 | Yavid et al. | |
| 2004/0190573 A1 | 9/2004 | Kruschwitz et al. | |
| 2005/0161685 A1 | 7/2005 | Velez et al. | |
| 2007/0177011 A1* | 8/2007 | Lewin et al. | 348/118 |
| 2008/0026838 A1 | 1/2008 | Dunstan et al. | |
| 2008/0074894 A1* | 3/2008 | Decoster et al. | 362/488 |
| 2008/0080572 A1 | 4/2008 | Kamijima | |
| 2009/0027337 A1* | 1/2009 | Hildreth | 345/158 |
| 2009/0027622 A1 | 1/2009 | Lalley et al. | |
| 2009/0153752 A1 | 6/2009 | Silverstein | |
| 2009/0174943 A1 | 7/2009 | Takagi et al. | |
| 2009/0207873 A1 | 8/2009 | Jansen | |
| 2009/0266999 A1 | 10/2009 | Krattiger | |
| 2009/0278915 A1* | 11/2009 | Kramer et al. | 348/48 |
| 2009/0321614 A1* | 12/2009 | Drzymala | 250/208.1 |
| 2010/0005526 A1* | 1/2010 | Tsuji et al. | 726/21 |
| 2010/0020289 A1 | 1/2010 | Kamijima | |
| 2010/0030578 A1* | 2/2010 | Siddique et al. | 705/3 |
| 2010/0051834 A1 | 3/2010 | Lopatin | |
| 2010/0079581 A1* | 4/2010 | Russell et al. | 348/46 |
| 2010/0208038 A1* | 8/2010 | Kutliroff et al. | 348/46 |
| 2010/0290060 A1* | 11/2010 | Mohazzab et al. | 356/492 |
| 2011/0019056 A1* | 1/2011 | Hirsch et al. | 348/333.01 |
| 2011/0058023 A1* | 3/2011 | Boles et al. | 348/46 |
| 2011/0316978 A1* | 12/2011 | Dillon et al. | 348/46 |
| 2012/0020518 A1* | 1/2012 | Taguchi | 382/103 |
| 2012/0051588 A1 | 3/2012 | McEldowney | |

FOREIGN PATENT DOCUMENTS

| | | | |
|---|---|---|---|
| CN | 101451826 A | 6/2009 | |
| CN | 101254344 B | 6/2010 | |
| EP | 0583061 A2 | 2/1994 | |
| JP | 08044490 A1 | 2/1996 | |
| JP | 2005326192 A | 11/2005 | |
| WO | 93/10708 A1 | 6/1993 | |
| WO | 97/17598 A1 | 5/1997 | |
| WO | 99/44698 A1 | 9/1999 | |
| WO | WO2006/109308 A1 | 10/2006 | |

OTHER PUBLICATIONS

Zhao et al. "Harmonic diffractive optical element and its application". (Aug. 1998) Proc. SPIE 3551, Integrated Optoelectronics II, 184.*

Toyama, Kentaro, et al., "Probabilistic Tracking in a Metric Space," Eighth International Conference on Computer Vision, Vancouver, Canada, vol. 2, Jul. 2001, 8 pages.

Notice of Allowance and Fee(s) Due dated Aug. 27, 2012, U.S. Appl. No. 12/643,114, filed Dec. 21, 2009.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

(56) References Cited

OTHER PUBLICATIONS

Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
Ringbeck, "A 3D Time of Flight Camera for Object Detection," Optical 3-D Measurement Techniques 09, Plenary Session 1: Range Imaging I, 2007, http://www.ifm-electronic.com/obj/O1D_Paper-PMD.pdf.
Bove, "Personal Projection," Object-Based Media Group, MIT Media Library, Cambrige, MA, USA. http://web.media.mitedu/~vmb/papers/SMPTE144.pdf.
Freeman, "Scanned Laser Pico Projectors: Seeing the Big Picture (with a Small Device)," http://www.microvision.com/pdfs/Scanned%20Laser%20Pico%20Projectors.pdf.

Non-final Office Action dated May 16, 2012, U.S. Appl. No. 12/643,114, filed Dec. 21, 2009.
Response to Office Action dated Aug. 16, 2012, U.S. Appl. No. 12/643,114, filed Dec. 21, 2009.
Faklis, "Spectral Properties of Multiorder Diffractive Lenses", Applied Optics, May 10, 1995, pp. 2462-2468, vol. 34, No. 14, Optical Society of America.
Zhang, "High-Power Quantum-Dot Superluminescent LED with Broadband Drive Current Insensitive Emission Spectra Using a Tapered Active Region", IEEE Photonics Technology Letters, May 15, 2008, pp. 782-784, vol. 20, Issue 10, IEEE Photonics Society.
Konoplev, abstract of "Half-watt high-power single mode superluminescent LED at 1335 nm with single-facet electro-optical efficiency of 28%", Proceedings Paper, Mar. 7, 2005, vol. 5739, Light-Emitting Diodes: Research, Manufacturing, and Applications IX, website, SPIE, http://spie.org/x648.html?product_id=592043.
Ognev, "Kinoform Refraction Lens with Diffraction Calculation", Nuclear Fusion Institute, Russian Research Center, submitted Jun. 24, 2004, 8 pages, http://arxiv.org/ftp/physics/papers/0406/0406115.pdf.
Fan, "Spectral Domain Polarization Sensitive Optical Coherence Tomography Achieved by Single Camera Detection", Optics Express, Jun. 25, 2007, pp. 7950-7961, vol. 15, No. 13, Optical Society of America.
Chinese Office Action dated May 6, 2013, Chinese Patent Application No. 201110171635.4.
English Abstract of Japanese Patent Publication No. JP 2005326192 published Nov. 24, 2005.
English Abstract of Chinese Patent Application No. CN1818734 published Aug. 16, 2006.
English Abstract of Chinese Patent Application No. CN101191999 published Jun. 4, 2008.
English Abstract of Chinese Patent Application No. CN101451826 published Jun. 10, 2009.
Response to Office Action dated Sep. 18, 2013, Chinese Patent Application No. 201110171635.4.
English translation of Amended Claims filed in Response to Office Action dated Sep. 18, 2013, Chinese Patent Application No. 201110171635.4.
Chinese Office Action dated Dec. 10, 2013, Chinese Patent Application No. 201110171635.4.

\* cited by examiner

DEPTH CAMERA ILLUMINATOR WITH SUPERLUMINESCENT LIGHT-EMITTING DIODE

BACKGROUND

Motion capture systems obtain data regarding the location and movement of a human body or other subject in a physical space, and can use the data as an input to an application in a computing system. Many applications are possible, such as for military, entertainment, sports and medical purposes. For instance, the motion of humans can be mapped to a three-dimensional (3-D) human skeletal model and used to create an animated character or avatar. Motion capture systems can include optical systems, including those using visible and invisible, e.g., infrared, light, which use cameras to detect the presence of a human in a field of view. Typically, the motion capture system includes an illuminator which illuminates the field of view, and an image sensor which senses light from the field of view to form an image. The illuminator includes a light source such as a laser.

SUMMARY

A 3-D depth camera system is provided. The 3-D depth camera system uses at least one light-emitting diode (LED) as a light source in an illuminator instead of a laser. For example, a superluminescent LED (SLED) can be used because of its high spatial coherence. As a result, safety concerns which are presented by the use of a laser are avoided. Emerging SLED technologies are expected to operate at a sufficiently high power to be successfully used in a 3-D depth camera system which is able to track humans or other objects in a typically sized room which is found in a home, for instance, under typical lighting conditions. SLEDs can be used to provide a powerful, high quality collimated light source which maintains the safety properties of a conventional LED. A single SLED can be used which is sufficiently powerful by itself, or groups of SLEDs can be combined.

In one embodiment, a 3-D depth camera system includes an illuminator comprising at least one superluminescent light-emitting diode (SLED). The system further includes a collimating lens which captures light from the at least one SLED to provide a collimated light source. An diffractive optical element (DOE) receives the collimated light source, and creates multiple diffracted light beams which illuminate a human target in a field of view. The bandwidth of the DOE is such that it creates a high contrast diffraction pattern suitable for system performance. Further, an image sensor creates a depth image of the pattern using light from the field of view. For example, the DOE can be achromatic.

The at least one SLED can output light at a near infrared wavelength, for instance, and with a power level of at least 75 milliwatts or 100 milliwatts, and up to 200 milliwatts or more. Moreover, multiple SLEDs can be used, where each SLED provides light to a respective micro lens, which in turn provides a respective partially collimated beam to the collimating lens. The collimating lens provides a single fully collimated light source to the achromatic diffractive optical element, by combining the respective partially collimated beams.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

DETAILED DESCRIPTION

A depth camera illuminator with a superluminescent light-emitting diode (SLED) is provided for use in a motion tracking system. One or more SLEDs are used which have a sufficient power to illuminate a field of view in an area such as a room in a home, and to reflect back from a human target or other object in the field of view to an image sensor. The one or more SLEDs can be provided in place of a laser to avoid safety issues and related design complexities and expenses. An achromatic diffractive optical element can be used when diffracting light from the one or more SLEDs into many separate light beams which extend in the field of view. In contrast to a binary diffractive optical element (DOE) which may be used with a laser, an achromatic (DOE) corrects for chromatic aberration which would otherwise result due to the wider range of wavelengths which are emitted by an SLED, compared to a laser. Note that a binary DOE which has a limited wavelength can also be used, but at the expense of system contrast which will degrade system performance but might be acceptable in some scenarios.

Regarding the safety issues which are present when a laser is used, although the concentration of a laser beam is reduced before its light is emitted toward a human target, the use of a laser presents the perception of a safety issue. Further, substantial design efforts are needed to ensure that the emitted light is safe, and that an unauthorized user cannot tamper with the laser. For example, a class 3 laser, which can be hazardous, may be used within a depth camera, along with optics which reduce the output power of the light which leaves the camera to a level which is comparable to light of a class 1 laser, which is safe for all applications. It would be advantageous to provide an alternative light source which avoids these complexities.

Figure 1:
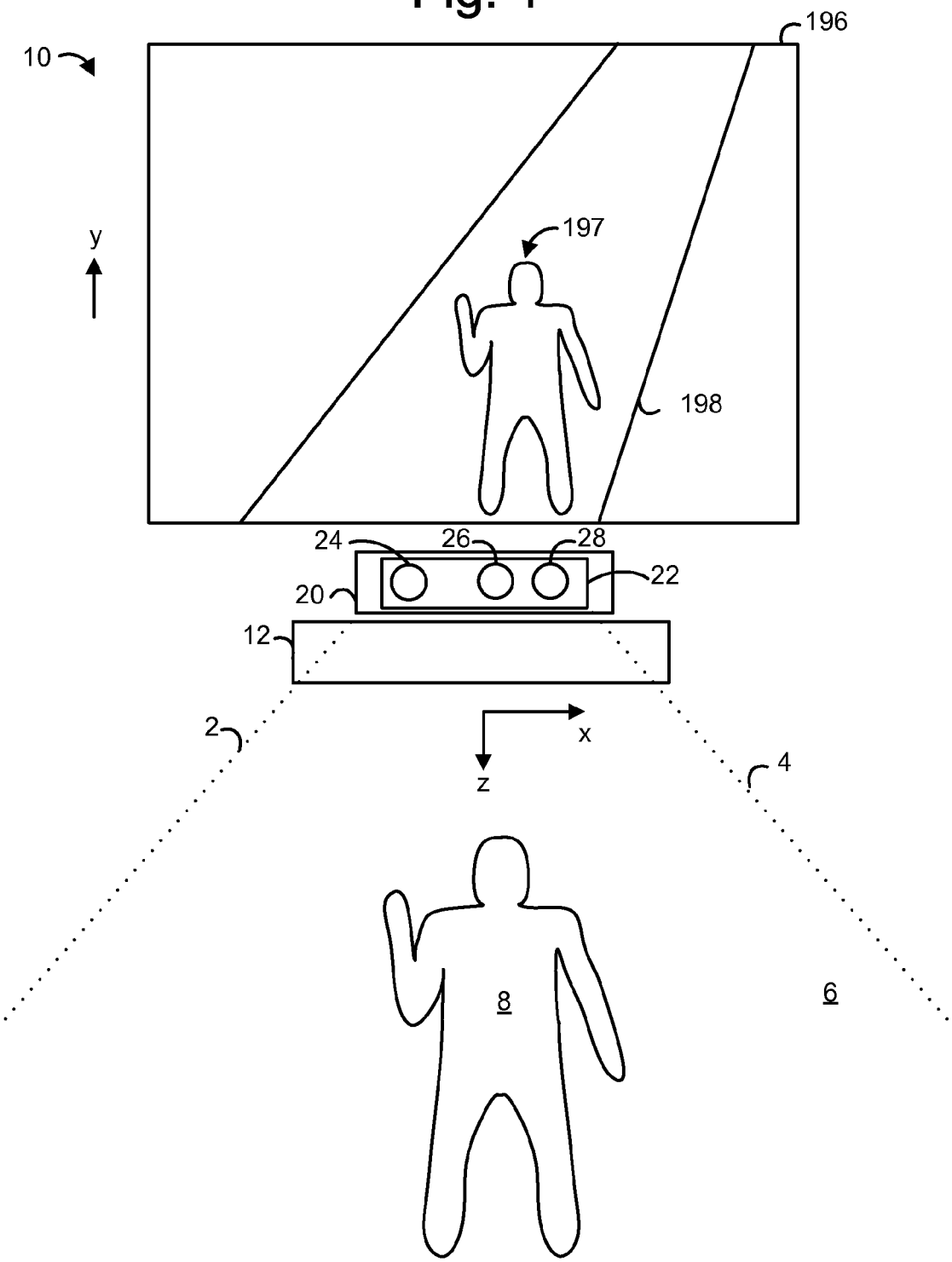
FIG. 1 depicts an example embodiment of a motion capture system.

FIG. 1 depicts an example embodiment of a motion capture system 10 in which a human 8 interacts with an application, such as in the home of a user. The motion capture system 10 includes a display 196, a depth camera system 20, and a computing environment or apparatus 12. The depth camera system 20 may include an image camera component 22 having an illuminator 24, such as an infrared (IR) light emitter, an image sensor 26, such as an infrared camera, and a red-green-blue (RGB) camera 28. A human 8, also referred to as a user, person or player, stands in a field of view 6 of the depth camera. Lines 2 and 4 denote a boundary of the field of view 6. In this example, the depth camera system 20, and computing environment 12 provide an application in which an avatar 197 on the display 196 track the movements of the human 8. For example, the avatar may raise an arm when the human raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track one or more human targets. The computing environment 12 can include a computer, a gaming system or console, or the like, as well as hardware components and/or software components to execute applications.

The depth camera system 20 may include a camera which is used to visually monitor one or more people, such as the human 8, such that gestures and/or movements performed by the human may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The human 8 may be tracked using the depth camera system 20 such that the gestures and/or movements of the user are captured and used to animate an avatar or on-screen character and/or interpreted as input controls to the application being executed by computer environment 12.

Some movements of the human 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the human 8 may be available, used, and analyzed in any suitable manner to interact with an application.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the human 8.

Figure 2:
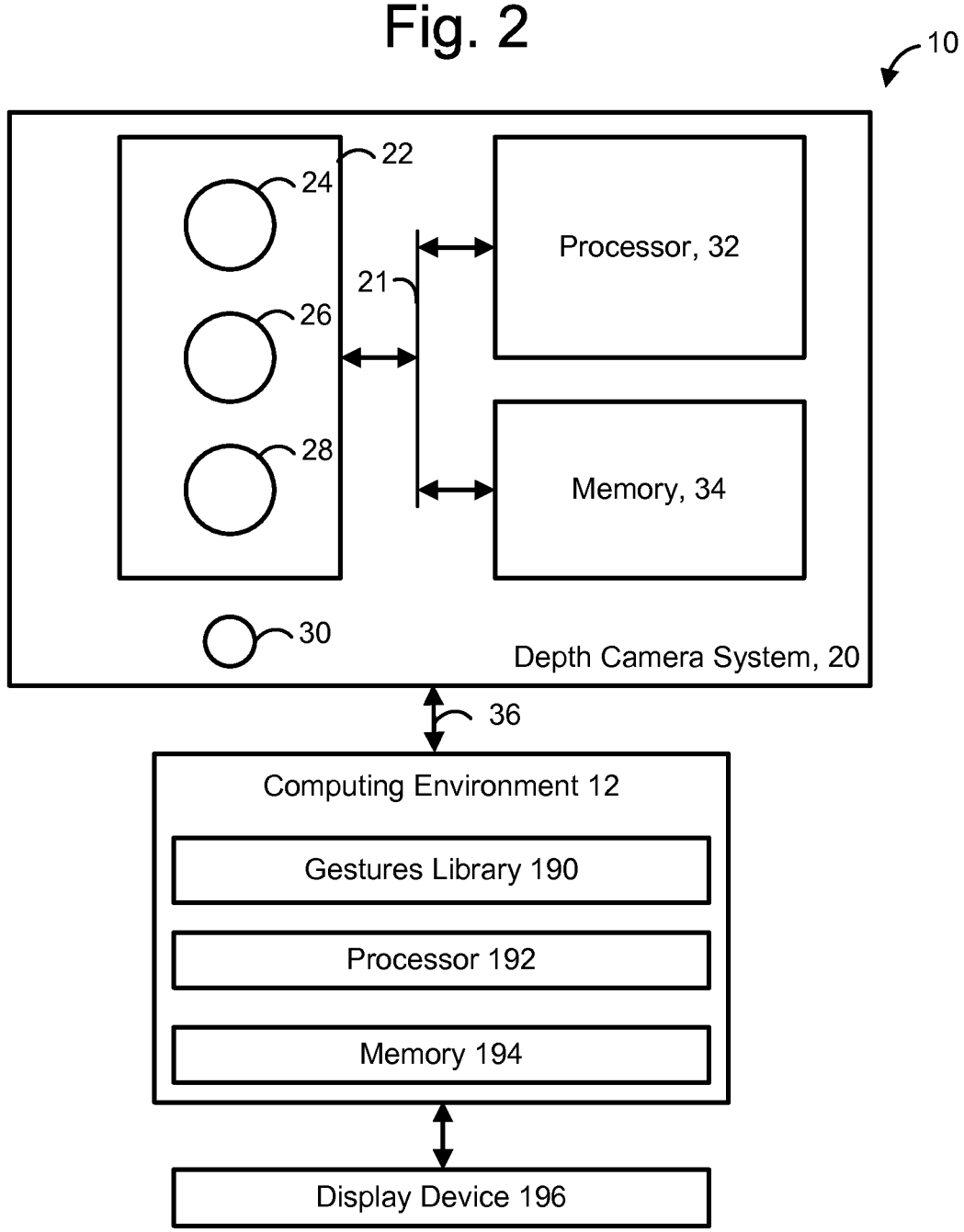
FIG. 2 depicts an example block diagram of the motion capture system of FIG. 1.

FIG. 2 depicts an example block diagram of the motion capture system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22 that captures the depth image of a scene in a physical space. The depth image may include a two-dimensional (2-D) pixel area of the captured scene, where each pixel in the 2-D pixel area has an associated depth value which represents a linear distance from the image camera component 22, thereby providing a 3-D depth image.

The image camera component 22 may include an illuminator 24, such an infrared (IR) light emitter 24, an image sensor 26, such as an infrared camera, and a red-green-blue (RGB) camera 28 that may be used to capture the depth image of a scene or provide an additional camera for other applications. A 3-D depth camera is formed by the combination of the infrared emitter 24 and the infrared camera 26. For example, in a time-of-flight analysis, the illuminator 24 emits infrared light onto the physical space and the image sensor 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the illuminator 24. Upon striking the surface of one or more targets or objects in the scene, the pattern may become deformed in response. Such a deformation of the pattern may be captured by, for example, the image sensor 26 and/or the RGB camera 28 and may then be analyzed to determine a physical distance from the depth camera system to a particular location on the targets or objects.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the 3-D depth camera 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the image sensor 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 3:
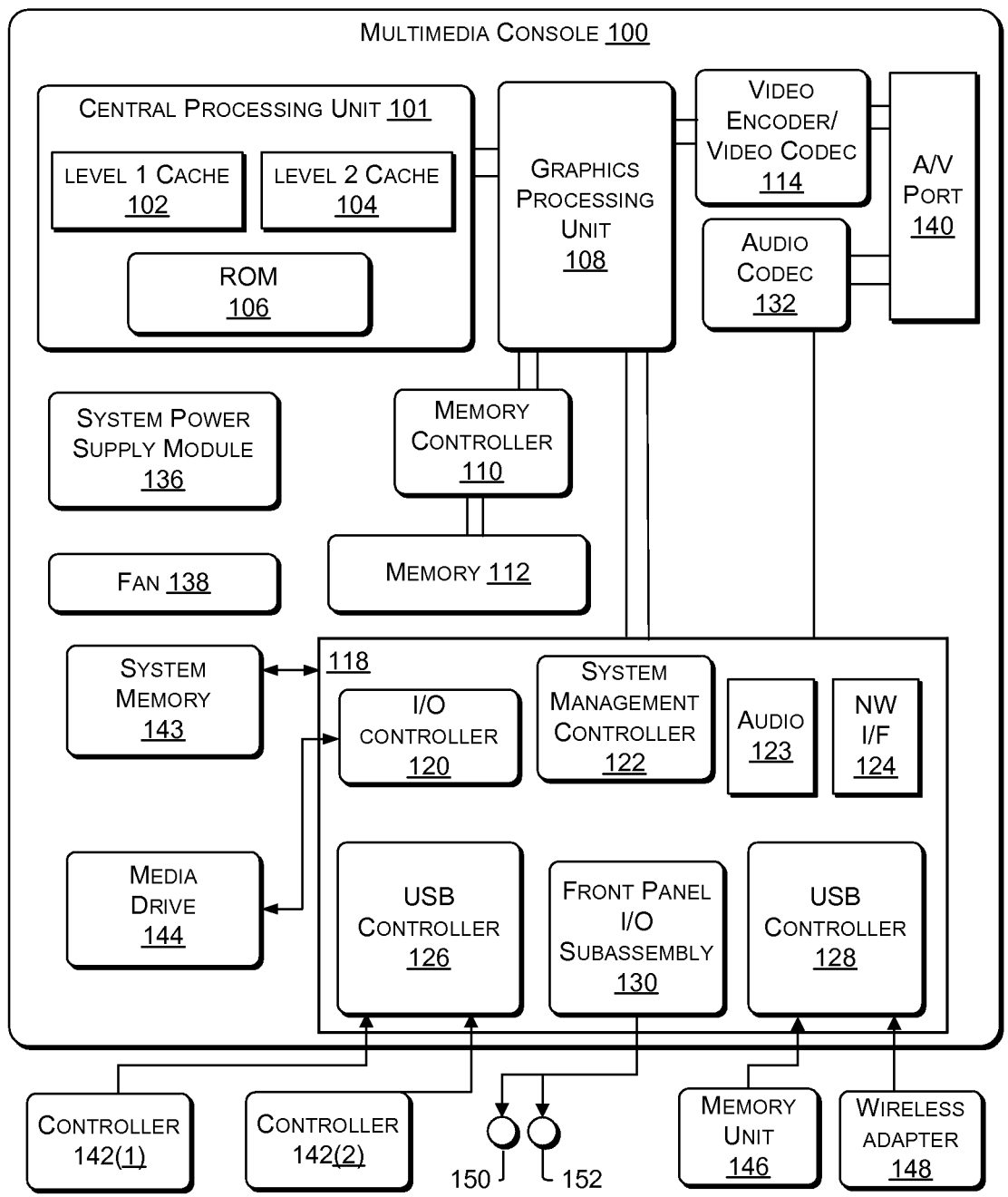
FIG. 3 depicts an example block diagram of a computing environment that may be used in the motion capture system of FIG. 1.

FIG. 3 depicts an example block diagram of a computing environment that may be used in the motion capture system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
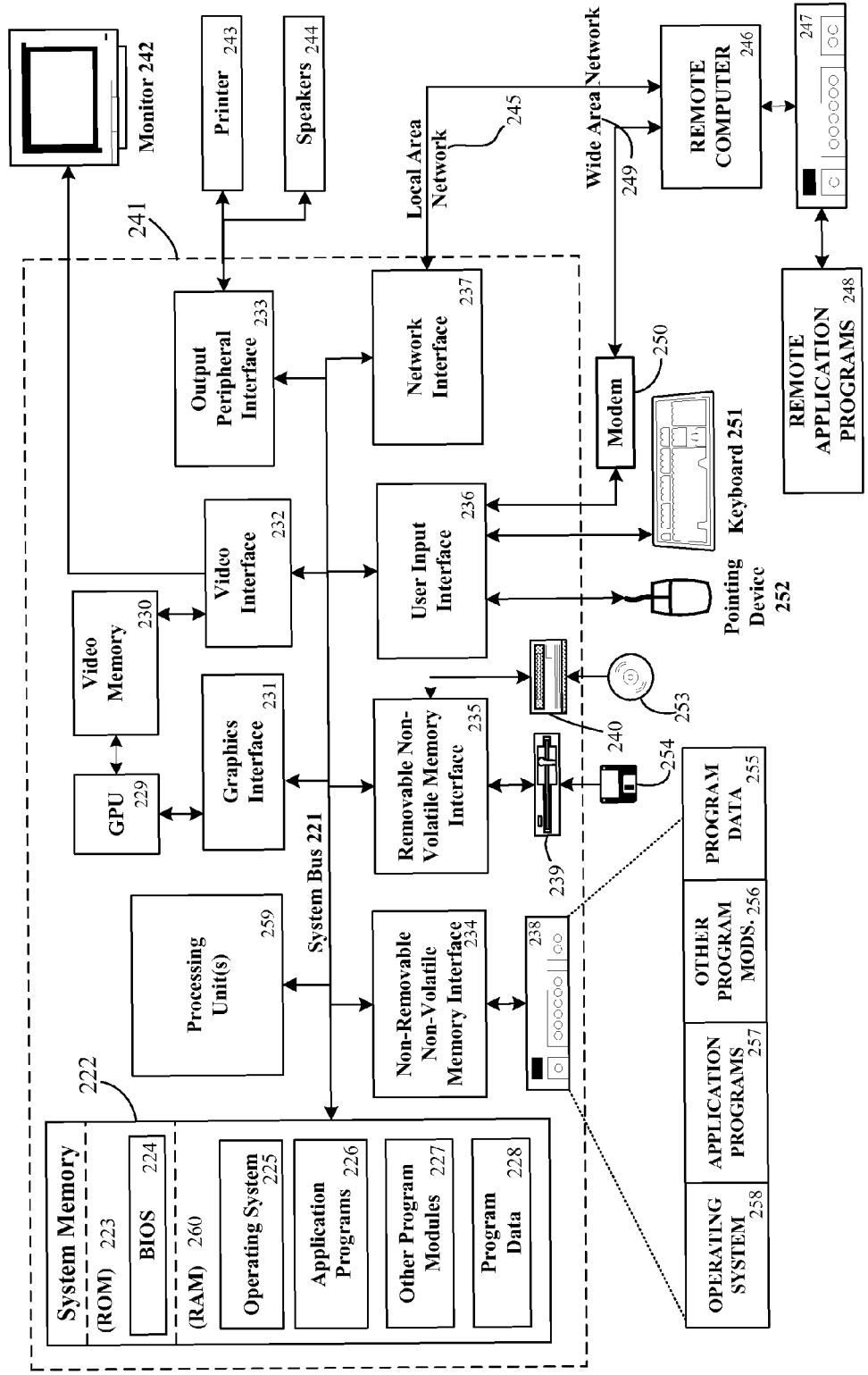
FIG. 4 depicts another example block diagram of a computing environment that may be used in the motion capture system of FIG. 1.

FIG. 4 depicts another example block diagram of a computing environment that may be used in the motion capture system of FIG. 1. In a motion capture system, the computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

The computing environment can include tangible computer readable storage having computer readable software embodied thereon for programming at least one processor to perform a method for generating proxy training data for human body tracking as described herein. The tangible computer readable storage can include, e.g., one or more of components 222, 234, 235, 230, 253 and 254. Further, one or more processors of the computing environment can provide a processor-implemented method for generating proxy training data for human body tracking, comprising processor-implemented steps as described herein. A processor can include, e.g., one or more of components 229 and 259.

Figure 5A:
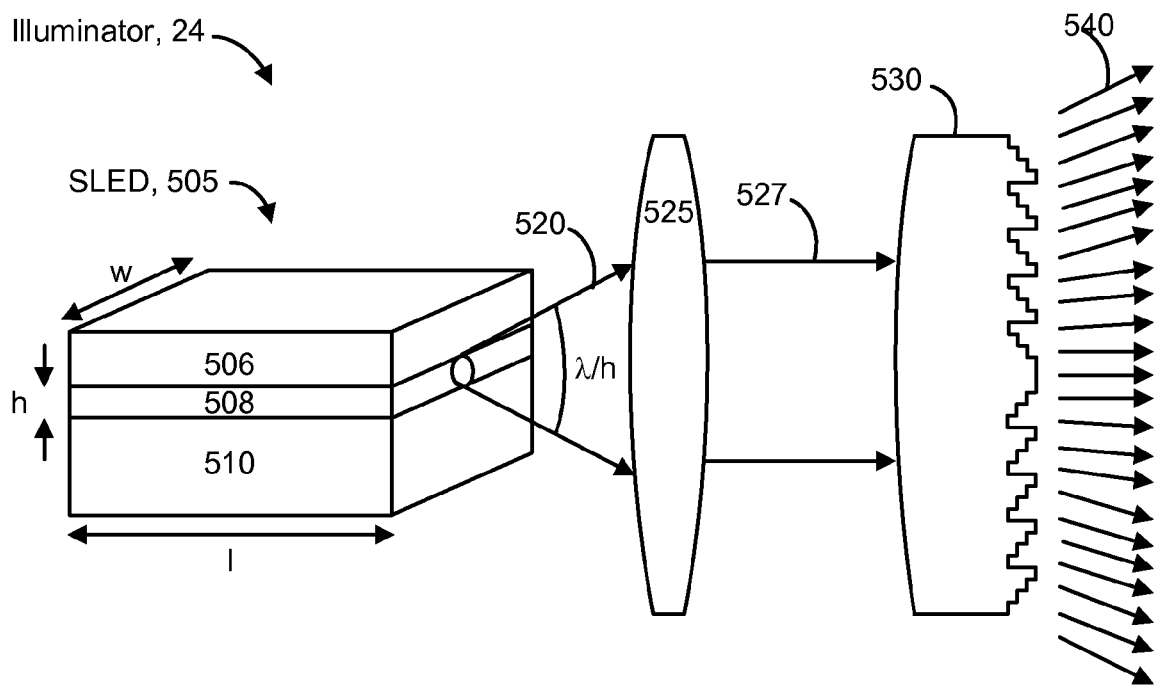
FIG. 5A depicts an example configuration of the illuminator 24 of the 3-D depth camera 22 of FIG. 2.

FIG. 5A depicts an example configuration of the illuminator 24 of the 3-D depth camera 22 of FIG. 2. As mentioned, a depth camera system typically includes an illumination system, such as the illuminator 24 of FIGS. 1 and 2, and an imaging system such as the image sensor 26 of FIGS. 1 and 2.

In some cases, the illuminator is a projector which illuminates a human target or other object in a field of view with some pattern, in a structured light approach to determining depth, or at some modulation phase, in a time-of-flight approach to determining depth. When a laser is used as a light source in the illuminator, the light has a narrow wavelength bandwidth, and an imaging system is provided which includes a narrow band pass filter matched to the wavelength of the light. It is desirable to move away from using a laser as an illumination source, and to use an SLED instead. However, the bandwidth of the SLED can be too wide to create a high contrast illumination pattern with the type of binary DOE which is used with a laser light source. This might be acceptable for some scenarios but not for others. However, an SLED with an achromatic DOE can be used to replace the laser and binary DOE in an illumination system and equivalent performance can be achieved. Advantageously, the laser can be eliminated as the light source in a depth camera illumination system.

A superluminescent light-emitting diode (SLED), also referred to as a superluminescent diode, is an optoelectronic semiconductor device which emits broadband optical radiation based on super luminescence. It is similar in construction to a laser diode, and includes an electrically driven p-n junction and an optical waveguide. However, the SLED lacks optical feedback, so that no laser action can occur. Optical feedback can be suppressed using various approaches such as tilting the facets relative to the waveguide, and/or by use of anti-reflection coatings. An SLED is a semiconductor optical amplifier in which amplified spontaneous emission occurs. An SLED is similar to an LED in that it uses the amplitude spontaneous emission from a laser cavity, but the SLED also uses the design of a laser cavity to achieve a high degree of spatial coherence so the emitting beam can be collimated using simple collimation techniques.

SLED technology is advancing such that sufficiently high output powers are either currently available or are becoming available. In some cases, adjustments can be made to the cavity of the SLED to increase the power of the output light. In other cases, if a single SLED with sufficient output power is not available, multiple SLEDs can be combined. Generally, the output power of one SLED which is suitable for use in a depth camera can be at least 75 milliwatts, or at least about 100 to 200 milliwatts or more. Or, the combined output power of multiple SLEDs can be at least 75 milliwatts, or at least about 100 to 200 milliwatts. If the SLED light output is not sufficiently powerful, the dynamic range of the depth camera is reduced, which will impact the maximum distance at which a target can be detected or the level of ambient light the user is allowed. The depth camera will still function at a reduced level in appropriate conditions. For example, the level of the ambient lighting in the field of view might need to be limited, the SLED light might be visible to the human target in the field of view, and the field of view over which the depth camera can operate might be limited.

Examples SLED technologies which may be suitable for use in a depth camera system are discussed below.

For example, Zhang, Z. Y. et al., incorporated herein by reference, in "High-Power Quantum-Dot Superluminescent LED With Broadband Drive Current Insensitive Emission Spectra Using a Tapered Active Region," IEEE Photonics Technology Letters, May 15, 2008, vol. 20, issue 10, pp. 782-784, state that high-power and broadband quantum-dot (QD) superluminescent light-emitting diodes are realized by using a combination of self-assembled QDs with a high density, large inhomogeneous broadening, a tapered angled pump region, and etched V groove structure. They provide a broad-area device which exhibits greater than 70-nm 3-dB bandwidth and drive current insensitive emission spectra with 100-mW output power under continuous-wave operation. For pulsed operation, greater than 200-mW output power is obtained.

Konoplev, O. A. et al., incorporated herein by reference, in "Half-watt high-power single mode superluminescent LED at 1335 nm with single-facet electro-optical efficiency of 28%," SPIE Proceedings, Vol. 5739, Light-Emitting Diodes: Research, Manufacturing, and Applications IX, Steve A. Stockman; H. Walter Yao; E. Fred Schubert, Editors, pp. 66-80, Mar. 7, 2005, provide a half-Watt level single spatial mode superluminescent laser diode at 1335 nm. Output optical power in excess of 500 mW from a single facet of angle-striped waveguide was realized at 10° C. of heat sink temperature with peak electro-optical efficiency of 28%. To their knowledge, this is the highest optical power and electro-optic conversion efficiency in a SLED device reported so far in the literature. They report that further optimization could lead to: 1) the creation of a high power optical device (SLED) with electro-optical efficiencies approaching and/or exceeding that of Fabry-Perot lasers (counting both facet outputs) with absolute optical power levels compared to that of Fabry-Perot lasers, 2) Electro-optical efficiencies approaching internal quantum efficiencies which could well exceed the 70-80% range observed in present commercial semiconductor laser and light-emitting structures.

U.S. patent application publication 2009/0207873 to Jansen, incorporated herein by reference, discusses an optical amplifier chip which can be operated as superluminescent LED. The chip uses a zigzag optical path which couples two or more gain elements. Each individual gain element has a circular aperture and includes a gain region and at least one distributed Bragg reflector. The chip can include at least two gain elements that are spaced apart and have a fill factor no greater than 0.5 so that total optical gain is increased.

U.S. Pat. No. 7,671,997 to Jayaraman, incorporated herein by reference, provides a high power broadband SLED. The SLED has a uniform AlGaInAs quantum well on an InP substrate, emitting in a range of 1100 to 1800 nm. The favorable conduction band-to-valence band offset ratio of this material system enables superluminescent diodes which simultaneously provide high power and large optical bandwidth. Output power exceeding 100 mW and bandwidth exceeding 100 nm were demonstrated. In one embodiment, multiple uniform AlGaInAs quantum wells with two confined quantum states and energetic separation in a range of 100-130 nm are used. In another embodiment, non-uniform wells are used, with each well having two confined quantum states.

SLEDs have been used for applications such as medical imaging of tissue, such as with optical coherence tomography (OCT), for cardiovascular imaging, and for other biomedical purposes. Other applications of SLEDs include measuring the chromatic dispersion of optical fibers and other optical components, testing of optoelectronic components, use in fiber-optic sensors and use in fiber-optic gyroscopes. However, SLEDs have not been used for depth cameras, such as in a motion tracking system, or in other bandwidth-critical applications because too much light is thrown away. The system provided herein allows SLEDs to be used effectively for depth cameras, without discarding too much light.

Figure 5B:
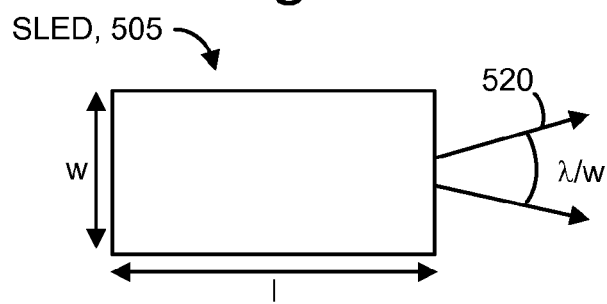
FIG. 5B depicts a top view of the SLED 505 of FIG. 5A.

In the simplified example of FIG. 5A, the illuminator 24 includes an SLED 505, a collimator lens 525 and an achromatic DOE 530. The SLED 505 and collimator lens 525 may be provided within a camera housing, for instance, while an external face of the achromatic DOE 530 is provided at a periphery of the housing so that it can illuminate a desired field of view. The SLED includes an active region 508, also referred to as a quantum well layer or a cavity, and cladding layers 506 and 510. The layers are typically semiconductor layers on a substrate. With a width w, a length l and a height h, the SLED emits light at an end face in a light beam 520 with a far field angular divergence of $\lambda/h$ radians in a plane which is perpendicular to a plane of the active layer, and with a far field angular divergence of $\lambda/w$ radians (FIG. 5B) in a plane which is parallel to the plane of the active layer. The angular divergence is typically larger than that of a laser, and depends on the number of transverse modes. The angular divergence is largest when there is only one transverse mode, and smaller when there are multiple transverse modes.

$\lambda$ represents the nominal wavelength of the light output by the SLED. Light refers to electromagnetic radiation, including infrared light, e.g., having a wavelength of 700 nm-3,000 nm, including near-infrared light, having a wavelength of 0.75 µm-1.4 µm, mid-wavelength infrared light having a wavelength of 3 µm-8 µm, and long-wavelength infrared light having a wavelength of 8 µm-15 µm, which is a thermal imaging region which is closest to the infrared radiation emitted by humans. Light can also include visible light at 390 nm-750 nm and ultraviolet radiation at 10 nm-390 nm. Thus, light from an SLED as used herein, and illumination with such light, can be visible or not visible to the normal human eye.

The SLED may provide a modulated light output in a time-of-flight depth sensing scheme, or may provide a constant light output in a structured light depth sensing scheme. In either case, the SLED can output light at a power level of at least about 200 milliwatts, for instance A collimating lens 525 receives the light beam from the SLED and provides a collimated light beam 527 with a high degree of collimation to the achromatic DOE 530. In response, the achromatic DOE 530 outputs multiple diffracted light beams 540. The achromatic DOE 530 can be formed by combining a lens with a diffractive surface, for instance. Generally, a DOE is used to provide multiple smaller light beams from a single collimated light beam. The smaller light beams define a field of view of a depth camera in a desired predetermined pattern. The DOE is a beam replicator, so all the output beams will have the same geometry as the input beam. For example, in a motion tracking system, it may be desired to illuminate a room in a way which allows tracking of a human target who is standing or sitting in the room. To track the entire human target, the field of view should extend in a sufficiently wide angle, in height and width, to illuminate the entire height and width of the human and an area in which the human may move around when interacting with an application of a motion tracking system. An appropriate field of view can be set based on factors such as the expected height and width of the human, including the arm span when the arms are raised overhead or out to the sides, the size of the area over which the human may move when interacting with the application, the expected distance of the human from the camera and the focal length of the camera.

For example, the field of view may be sufficient to illuminate a human standing 3-15 feet or more from the camera, where the human with arm span is seven feet high and six feet wide, and the human is expected to move in an area of +/−6 feet of a central location, e.g., in a floor area of 144 square feet. In other cases, the field of view can be designed to illuminate only the upper body area of a human. A reduced field of view may be acceptable when it is known that the user will likely be sitting down instead of standing up and moving around. The field of view can similarly be designed to illuminate an object other than a human. The DOE 530 may provide many smaller light beams, such as thousands of smaller light beams, from a single collimated light beam. Each smaller light beam has a small fraction of the power of the single collimated light beam. The smaller, diffracted light beams may have a nominally equal intensity.

When the collimated light beam is provided by a laser, the light is provided in a relatively small bandwidth. A binary DOE may be used to diffract laser light into multiple beams since it is effective over a narrow wavelength region. It does not correct for chromatic aberrations. A DOE has a periodic structure which acts as a dispersive element, splitting and diffracting light into several beams travelling in different directions. A binary DOE typically has a stepped surface with periodic, repeating structures which each have only two levels.

In some cases, the height of the stepped surface is on the order of one-half the wavelength of the light which is passed. For example, with light at 850 nm, the step height can be about 425 nm.

In contrast, an achromatic DOE corrects for chromatic aberration which would otherwise exists due to the wider range of wavelengths which are present in the light emitted by an SLED, compared to a laser. An achromatic DOE can have a stepped surface with periodic, repeating structures which each have more than two levels, e.g., three, four or more levels. Since the achromatic DOE uses multiple steps, it allows for the condition of one-half wavelength to be met at multiple wavelengths, thus creating a wider bandwidth. That is, the light which is passed can be roughly twice the step height, or some other specified multiple of the step height, for multiple step heights. Alternatively, a DOE can have continuous surfaces.

The diffractive pattern depicted is a simplification. In practice, a straightforward physics analysis can be used to design the diffractive pattern. Typically, a general diffractive phase profile on a given surface is described. The wavelength and location in space of two coherent point sources are defined and the resulting interference pattern describes the diffractive phase profile. Optimization programs treat the curvatures of surfaces, the thickness of elements, and the element spacings as variables. The optimization program can determine the optimum coefficients which describe the diffractive phase profile for any particular lens systems. Other design inputs can include the bandwidth of the light, the pattern to be created, the input power level, the diffraction efficiency and the desired uniformity of each diffracted beam.

Figure 5C:
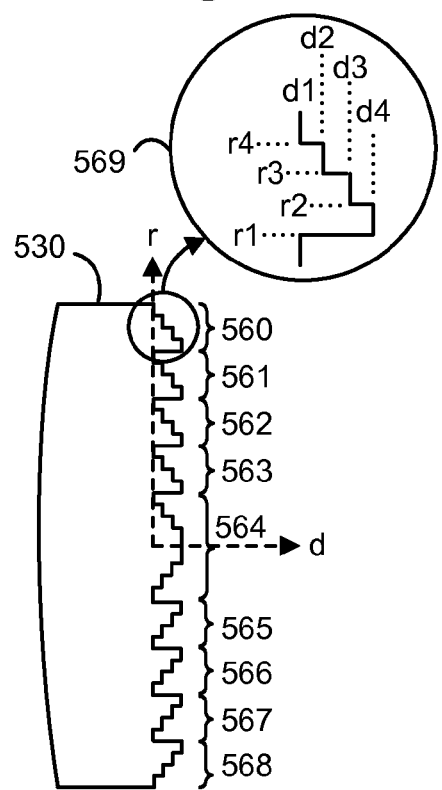
FIG. 5C depicts details of the achromatic diffractive optical element 530 of FIG. 5A, which has a multi-step diffraction profile.

FIG. 5C depicts details of the achromatic DOE 530 of FIG. 5A, which has a multi-step diffraction profile. The diffraction pattern on the surface of the DOE 530 can be unsymmetric radially with respect to the optical axis, which is through the center of the DOE 530, in one approach. Here, a central diffraction structure 564 is provided at the optical axis (axis d), and a number of successive diffraction structures extend outward radially from the optical axis. In the cross-sectional view of FIG. 5C, multi-level structures 560, 561, 562, 565, 566, 567 and 568 are depicted. Again, this is a simplification. The diffraction pattern can be defined relative to a coordinate system which includes the axis d, which depicts a depth along the coincident optical axis, and an axis r which depicts a radial distance from the axis d. The axis d could be coincident with the z-axis in FIG. 1, for instance. For example, the height of each level or step of the diffraction pattern can be represented by a value along the d axis, and a radial range over which the height is maintained can be represented by a range of values of r. A stepped achromatic DOE can be fabricated, e.g., by microlithography.

A blow up display 569 provides details of the multi-level structure 560 and how it can be defined by d and r dimensions. For example, the multi-level structure 560 could be defined by a series of successive points which are connected by straight lines, where the points are in this order and have these coordinates: (r1, d4), (r2, d3), (r3, d2), (r4, d1). The other multi-level structures could be defined similarly.

In some cases, the height of each stepped surface is some fraction (e.g., 1/N such as one half, where N is a real number or an integer) of a wavelength of the light which is to be passed. For example, the step of height d4 may pass light in a first wavelength range represented by N times the distance d4-d1, where N>1, the step of height d3 may pass light in a second wavelength range represented by N times the distance d3-d1, and the step of height d2 may pass light in a first wavelength range represented by N times the distance d2-d1. Additional steps can result in a finer granularity in passing additional smaller ranges of wavelengths of light.

A front view of the DOE 530 would indicate the radial unsymmetry of the diffraction pattern about the central optical axis. Generally, the diffraction pattern can provide a circular field of view, a field of view which is wider than it is tall, or taller than it is wide, and so forth. Moreover, the diffraction pattern can provide a relatively uniform dispersion of light beams in the field of view, so that the intensity or power of the light beams is approximately equal. Or, the diffraction pattern can provide a non-uniform dispersion of light beams in the field of view. For example, a higher intensity or power can be provided for the diffracted light beams in the center of the field of view than for the diffracted light beams at the edges of the field of view.

Figure 5D:
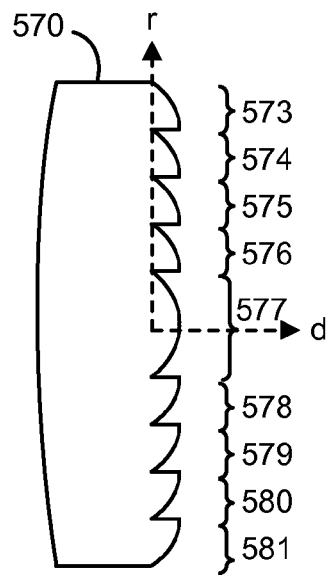
FIG. 5D depicts details of a achromatic diffractive optical element which has a continuous diffraction profile, as an alternative to the achromatic diffractive optical element 530 of FIG. 5C.

FIG. 5D depicts details of an achromatic DOE which has a continuous diffraction profile, as an alternative to the achromatic DOE 530 of FIG. 5C. The continuous achromatic DOE 570 has a gradually or continuously varying height in its diffraction pattern which can be represented by a varying value of d, and a radial range over which the height is varied can be represented by a range of values of r. In the cross-sectional view of FIG. 5D, continuous structures in the DOE include a central diffraction structure 577 which extends about the optical axis, and a number of successive diffraction structures which extend outward radially, including structures 573, 574, 575, 576, 578, 579, 580 and 581. Again, this is a simplification, as the structures will typically be radially unsymmetric. A continuous achromatic DOE can be fabricated, e.g., using photolithographic techniques and then etching—either chemical or plasma.

In a continuous design, a structure can extend about same distance along the d and r axes as a corresponding multi-step structure, but in a continuous, non-discrete manner. For example, the continuous structure 573 can extend a distance d4-d1 along the d axis, and a distance r4-r1 along the r axis (see FIG. 5C).

Figure 6:
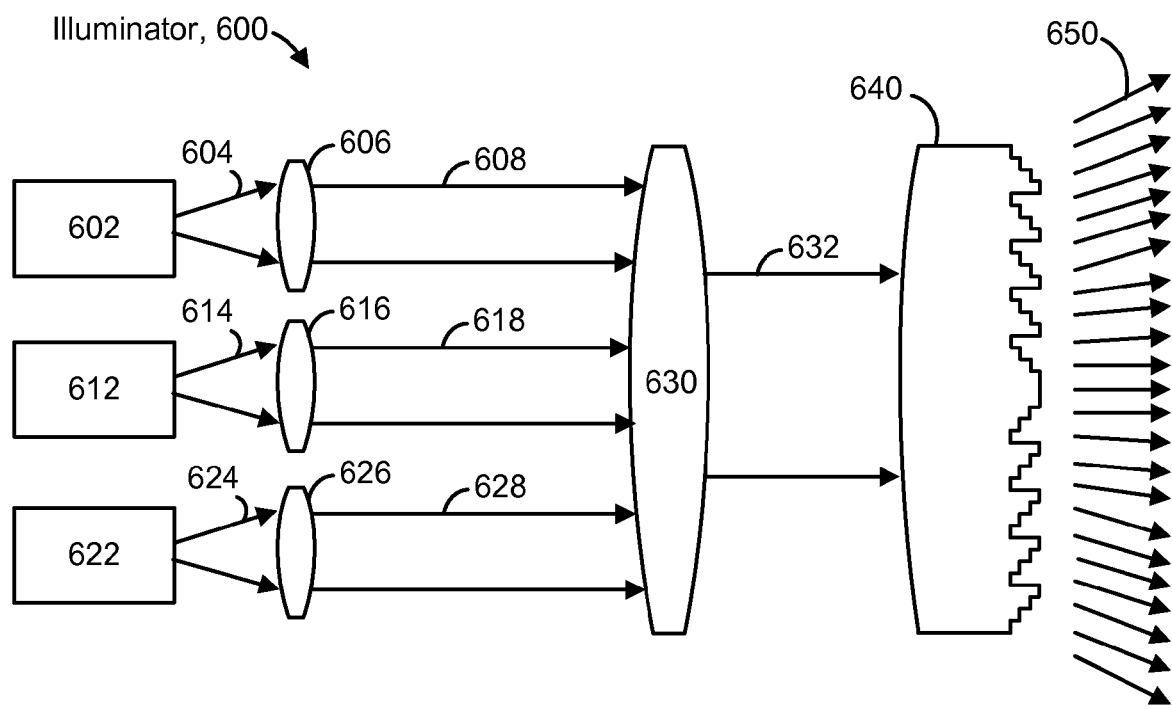
FIG. 6 depicts an illuminator which uses multiple SLEDs, as an alternative to the illuminator 24 of FIG. 5A.

FIG. 6 depicts an illuminator which uses multiple SLEDs, as an alternative to the illuminator 24 of FIG. 5A. As mentioned, a sufficient optical power output for a motion tracking application can be achieved using one or more SLEDs. When multiple SLEDs are combined, a microlens can be integrated to partially collimate the output from each SLED, and a collimating lens can be used to achieve a higher degree of collimation using the output from each microlens. Microlenses are small lenses, generally with diameters less than a millimeter. By combining multiple SLEDs, a desired power level can be achieved.

The illuminator 600 includes three SLEDs 602, 612 and 622 as an example. The SLED 602 outputs a light beam 604 to a microlens 606, which in turn outputs a partially collimated light beam 608 to a collimating lens 630. Similarly, the SLED 612 outputs a light beam 614 to a respective microlens 616, which in turn outputs a partially collimated light beam 618 to the collimating lens 630. Similarly, the SLED 622 outputs a light beam 624 to a respective microlens 626, which in turn outputs a partially collimated light beam 628 to the collimating lens 630. The collimating lens collimates the received light to provide a substantially fully collimated light beam 632 to an achromatic DOE 640 which includes a multi-step diffractive surface which outputs multiple diffracted light beams 650 in a field of view. Collimated light is light whose rays are nearly parallel, and therefore will spread or diverge slowly as it propagates.

Figure 7:
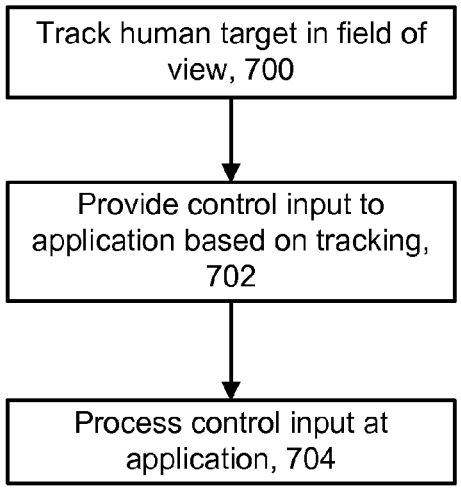
FIG. 7 depicts a method for providing a control input to an application in a motion capture system.

FIG. 7 depicts a method for providing a control input to an application in a motion capture system. Step 700 includes tracking a human target or user in a field of view of a depth camera system. A human target refers to, e.g., one or more people in a field of view of a depth camera system. For further details, see, e.g., FIG. 8. Step 702 includes providing a control input to an application based on the tracking For instance, the control input which represents a motion, such as a gesture, or a posture of a user. Step 704 includes processing the control input at the application. For example, this could include updating the position of an avatar on a display, where the avatar represents the user, as depicted in FIG. 1, selecting a menu item in a user interface (UI), or many other possible actions.

Figure 8:
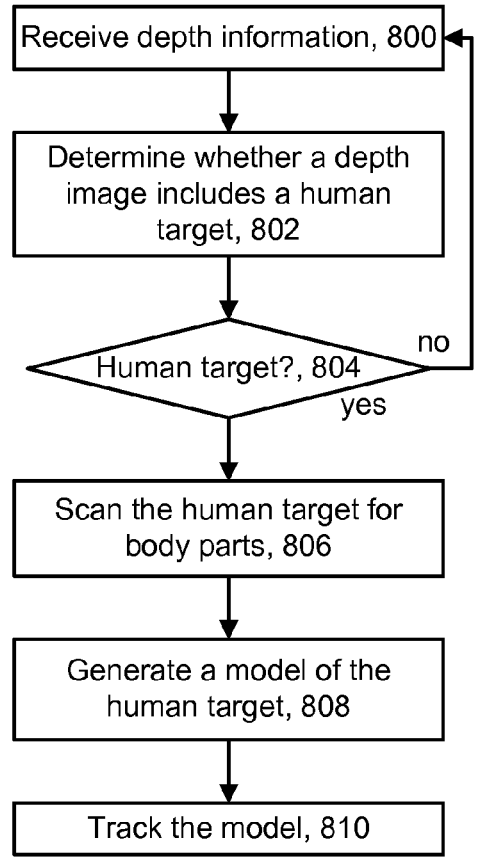
FIG. 8 depicts an example method for tracking a human target as set forth in step 700 of FIG. 7.

FIG. 8 depicts an example method for tracking a human target as set forth in step 700 of FIG. 7. The example method may be implemented using, for example, the depth camera system 20 and/or the computing environment 12, 100 or 420 as discussed in connection with FIGS. 2-4. One or more human targets can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with an application that is executed by the computing environment. The scan to generate the model can occur when an application is started or launched, or at other times as controlled by the application of the scanned person.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 800, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image or map having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information such that the depth information may used to generate a model such as a skeletal model (see FIG. 9).

Step 802 determines whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If the depth image includes a human target, at decision step 804, step 806 is performed. If decision step 804 is false, additional depth information is received at step 800.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 806 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 808 includes generating a model of the human target. In one embodiment, measurement values determined by the scanned bitmask may be used to define one or more joints in a skeletal model. The one or more joints are used to define one or more bones that correspond to a body part of a human.

One or more joints may be adjusted until the joints are within a range of typical distances between a joint and a body part of a human to generate a more accurate skeletal model. The model may further be adjusted based on, for example, a height associated with the human target.

At step 810, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

Figure 9:
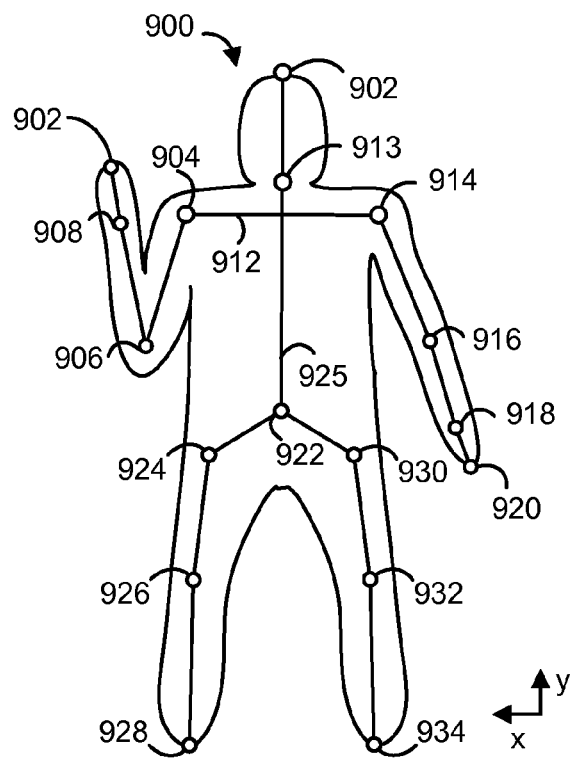
FIG. 9 depicts an example model of a human target as set forth in step 808 of FIG. 8.

FIG. 9 depicts an example model of a human target as set forth in step 808 of FIG. 8. The model 900 is facing the depth camera, in the −z direction, so that the cross-section shown is in the x-y plane. Note the vertical y-axis and the lateral x-axis. A similar notation is provided in other figures such as FIG. 1. The model includes a number of reference points, such as the top of the head 902, bottom of the head or chin 913, right shoulder 904, right elbow 906, right wrist 908 and right hand 910, represented by a fingertip area, for instance. The right and left side is defined from the user's perspective, facing the camera. The model also includes a left shoulder 914, left elbow 916, left wrist 918 and left hand 920. A waist region 922 is also depicted, along with a right hip 924, right knew 926, right foot 928, left hip 930, left knee 932 and left foot 934. A shoulder line 912 is a line, typically horizontal, between the shoulders 904 and 914. An upper torso centerline 925, which extends between the points 922 and 913, for example, is also depicted.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A camera motion capture system, comprising:
a 3-D depth camera comprising an illuminator and an image sensor, the illuminator comprises: (i) at least one superluminescent light-emitting diode outputting light at a near infrared wavelength and at a power level of at least 75 milliwatts, (ii) a collimating lens which captures the light from the at least one superluminescent light-emitting diode to provide a collimated light beam, and (iii) a diffractive optical element which receives the collimated light beam; and
creates a plurality of diffracted light beams which define a field of view, the field of view extends in a sufficiently wide angle, in height and width, to illuminate an entire height and width of a human target while the human target moves around in a floor area when interacting with an application of the motion capture system; and the image sensor senses reflected light from the human target in the field of view and creates a depth image of the human target using the reflected light from the field of view; and
at least one processor associated with the image sensor, the at least one processor tracks movement of the entire height and width of the human target in the floor area using the depth image.

2. The motion capture system of claim 1, wherein:
the diffractive optical element is an achromatic diffractive optical element.

3. The motion capture system of claim 1, wherein:
the at least one processor detects a gesture of the human target and provides a control input to the application based on the gesture; and
the application updates a display based on the control input.

4. The motion capture system of claim 1, wherein:
the power level is at least 100 to 200 milliwatts.

5. The motion capture system of claim 2, wherein:
the achromatic diffractive optical element comprises a plurality of stepped, multi-level diffractive structures on one side, each structure has three or more levels.

6. The motion capture system of claim 2, wherein:
the achromatic diffractive optical element has a continuous diffraction profile.

7. The motion capture system of claim 1, wherein:
the at least one superluminescent light-emitting diode operates in a modulated mode and the power level is at least 200 milliwatts.

8. The motion capture system of claim 1, wherein:
the at least one superluminescent light-emitting diode operates in a continuous mode.

9. The motion capture system of claim 1, wherein:
the plurality of diffracted light beams have a nominally equal intensity.

10. The motion capture system of claim 2, wherein:
the achromatic diffractive optical element comprises a stepped, multi-level diffractive surface on one side, with three or more levels.

11. The motion capture system of claim 1, wherein:
the at least one superluminescent light-emitting diode comprises multiple superluminescent light-emitting diodes; and
the motion capture system further comprises a respective microlens for each superluminescent light-emitting diode, the collimating lens captures light from the respective microlenses to provide the collimated light beam.

12. A motion capture system, comprising:
a depth camera system, the depth camera system comprises at least one superluminescent light-emitting diode and an achromatic diffractive optical element which illuminates an entire human body in a field of view using light from the at least one superluminescent light-emitting diode while the human body moves around in a floor area when interacting with an application of the motion capture system, and at least one image sensor which senses reflected light from the entire human body in the field of view, the at least one superluminescent light-emitting diode outputting light at a near infrared wavelength and at a power level of at least 75 milliwatts;

a display; and one of more processors in communication with the depth camera system and the display, the one or more processors execute instructions to create a skeletal model of the entire human body and track movement of the human body in the field of view over time based on the skeletal model, and to provide a signal to update the display based on the movement of the human body over time.

13. The motion capture system of claim 12, wherein:
the display is updated by updating an avatar in a virtual world, and the avatar represents the human body.

14. The motion capture system of claim 12, wherein:
the achromatic diffractive optical element comprises a plurality of stepped, multi-level diffractive structures on one side, each structure has three or more levels.

15. The motion capture system of claim 1, wherein:
the at least one processor creates a skeletal model of the entire height and width of the human target and tracks movement of the skeletal model.

16. A method for use in a motion capture system, comprising:

illuminating an entire human body in a field of view using a plurality of diffracted light beams from at least one superluminescent light-emitting diode, the light beams are at a near infrared wavelength and at a power level of at least 75 milliwatts, the plurality of diffracted light beams define the field of view, and the field of view extends in a sufficiently wide angle, in height and width, to illuminate an entire height and width of the human body while the human body moves around in a floor area when interacting with an application of the motion capture system;

sensing reflected light from the human body in the field of view;

using the reflected light, create a skeletal model of the entire human body and track movement of the entire human body in the field of view over time; and provide a signal to update a display based on the movement of the human body over time.

17. The method of claim 16, wherein:
the at least one superluminescent light-emitting diode is in a 3-D depth camera; and
the field of view is sufficient to illuminate the entire height and width of the human body, including an arm span of the human body, while the human body is standing 3-15 feet or more from the 3-D depth camera.

18. The motion capture system of claim 1, wherein:
the field of view is sufficient to illuminate the entire height and width of the human target, including an arm span of the human target, while the human target is standing 3-15 feet or more from the 3-D depth camera.

19. The motion capture system of claim 1, wherein:
the field of view is sufficient to illuminate the entire height and width of the human target while the human target moves around in 144 square feet of the floor area.

20. The motion capture system of claim 1, wherein:
the field of view is sufficient to illuminate the entire height and width of the human target, including an arm span of the human target which is seven feet high and six feet wide, while the human target is standing 3-15 feet or more from the 3-D depth camera.

* * * * *